United States Patent [19]
Kamino et al.

[11] Patent Number: 5,335,140
[45] Date of Patent: Aug. 2, 1994

[54] DRAWER-TYPE CIRCUIT INTERRUPTER

[75] Inventors: Toshihide Kamino, Kishiwada;
Junichi Sonoda, Kawachinagano;
Hirofumi Ogawa, Yamatokoriyama;
Takeshi Endo, Nara, all of Japan

[73] Assignee: Terasaki Denki Sangyo Kabushiki Kaisha, Osaka, Japan

[21] Appl. No.: 20,360

[22] Filed: Feb. 22, 1993

[30] Foreign Application Priority Data

Feb. 27, 1992 [JP] Japan .................................. 4-041495
Feb. 12, 1993 [JP] Japan .................................. 5-024222

[51] Int. Cl.$^5$ .............................................. H02B 11/12
[52] U.S. Cl. ...................................... 361/608; 335/132
[58] Field of Search ................. 200/50 AA; 335/132, 335/202; 361/336-342

[56] References Cited

FOREIGN PATENT DOCUMENTS

| | | |
|---|---|---|
| 8617306 | 1/1989 | Fed. Rep. of Germany . |
| 89038355 | 7/1989 | Fed. Rep. of Germany . |
| 4016706 | 11/1991 | Fed. Rep. of Germany . |
| 59-829 | 6/1984 | Japan . |
| 0262892 | 12/1926 | United Kingdom . |
| 1275655 | 5/1972 | United Kingdom . |
| 2128810 | 5/1984 | United Kingdom . |

OTHER PUBLICATIONS

A. Erk and M. Schmelzle: German Text Book entitled "Grundlagen der Schaltgeratetechnik", Springer-Verlag Berlin, Heidelberg, New York, 1974, pp. 171, 238-241, ISBN 3-540-06075-8.

Primary Examiner—Gregory D. Thompson

[57] ABSTRACT

A drawer-type circuit interrupter is constructed with a first contact member having an open-and-close contact member, an open-and-close operation mechanism for operating said first contact member, an interrupter main body having a second contact member and a mounting frame having the external line contact terminals, wherein the second contact member is a movable-type provided with an open-and-close contact portion that is contactable with and separable from the first contact member on the one end thereof and a drawer contact member that contacts with an external line contact terminal on the other end thereof, and a compression spring for urging the second contact member into a direction for contacting the external line contact terminal on the other end of the second contact member. When the interrupter body is in the connected position the drawer contact portion on the other end of said second contact member and said external line contact terminal are into contact. The second contacting member and the external line connecting terminal can be constituted to contact each other at a plurality of points, for example two, to improve contact and interruption performance.

6 Claims, 13 Drawing Sheets

DRAWER-TYPE CIRCUIT INTERRUPTER

BACKGROUND OF THE INVENTION

The present invention relates to a drawer-type circuit interrupter, in particular to a contact device of such a drawer-type circuit interrupter.

Conventionally, the maintenance and checkout of a circuit interrupter provided in an electric circuit is usually done by removing the circuit interrupter from a switchboard, etc. In removing such circuit interrupter, it is necessary to cut-off electric power and interrupt service for safety purpose, because the electric wires must be disconnected when the circuit interrupter is removed. However, when the electric power source in a large electric circuit system is interrupted, the cutoff effects the other electric circuits provided in parallel with the one for which the circuit interrupter is to be checked out, causing the great problems.

Therefore, there are many instances where the circuit interrupter used in such electric circuits, particularly large type circuit interrupters are made as drawer-type circuit interrupters consisting of a mounting frame secured on a construction such as a switchboard and an interrupter main body removably provided on the mounting frame. In the case of drawer-type circuit interrupter, however the maintenance thereof can be easily done without causing any interruption, because the main body of the circuit interrupter can be dismantled without removing the outer wires connected to the terminals provided on the mounting frame.

DESCRIPTION OF THE PRIOR ART

Figure 16:
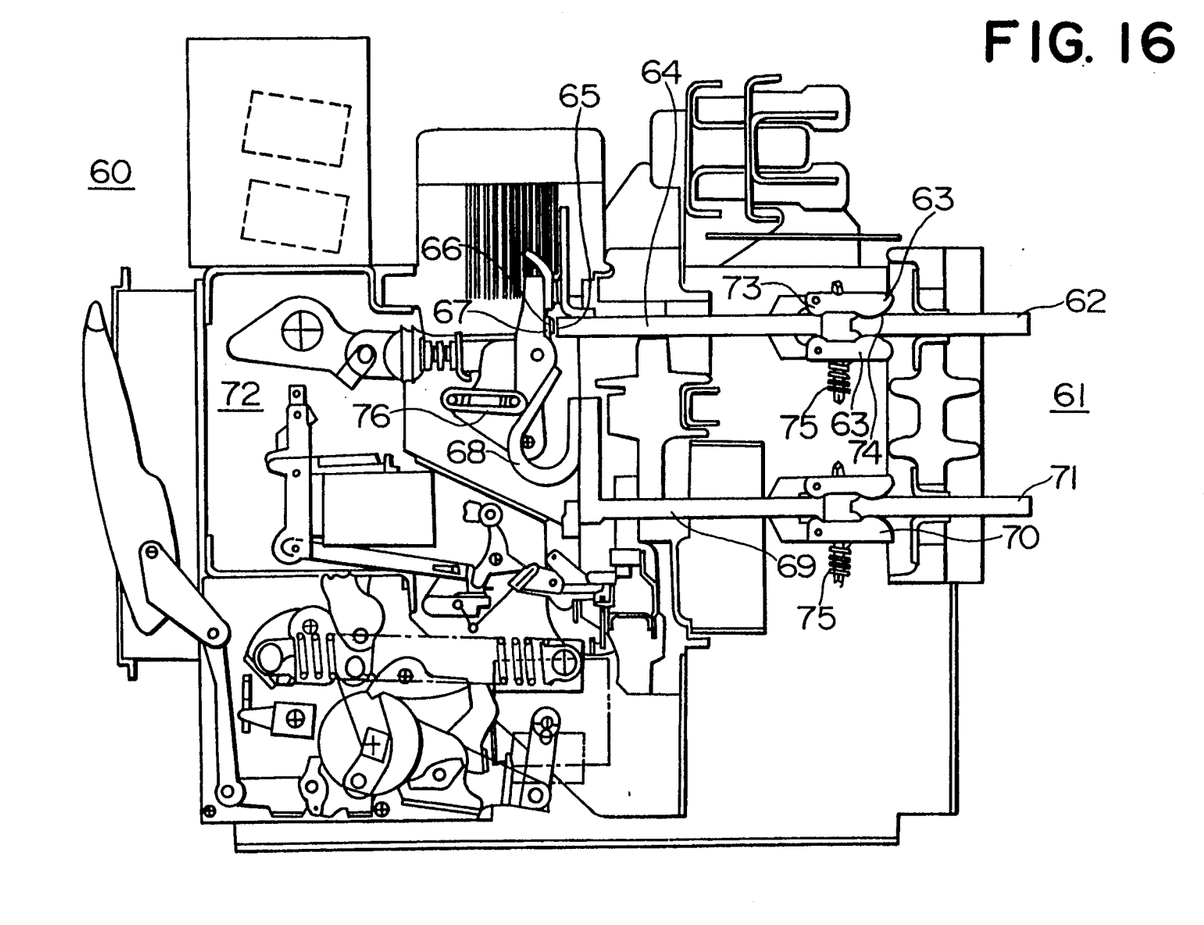
FIG. 16 is a side sectional view of a drawer-type circuit interrupter in the prior art showing the interrupter body connected to the mounting frame with the interrupter body in a closed condition.
Figure 17:
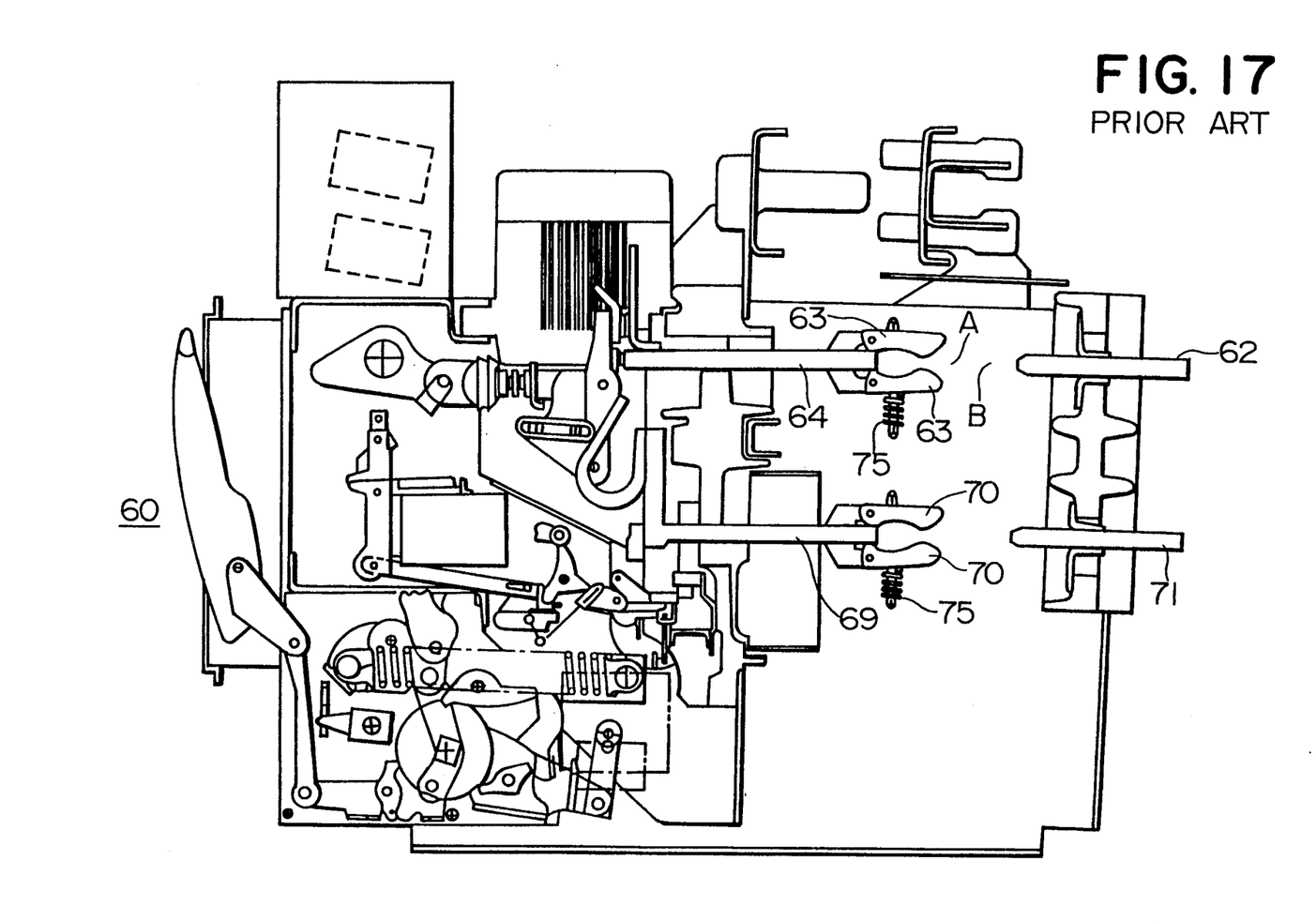
FIG. 17 is a side sectional view of a drawer-type circuit interrupter of the prior art showing the interrupter in a disconnected condition with the mounting frame with the interrupter body in a closed condition.

An example of a drawer-type circuit interrupter in the prior art is shown in FIGS. 16 and 17.

FIG. 16 shows an interrupter main body 60 in a closed state upon and in connected condition of which both the main body 60 is received within a mounting frame 61 and the main body 60 and the mounting frame 61 are electrically connected.

A path of electric flow is formed from a terminal 62, a drawer contact member 63, a stationary contact member 64, a contact 65, a contact 66, a movable contact member 67, a flexible conductor 68, a main body terminal 69, a drawer contact member 70 and a terminal 71. The terminal 62 and the terminal 71 are fixedly mounted on the frame 61 and are respectively connected with the external lines. The stationary contact member 64 and the main body terminal 69 are secured on the interrupter main body 60, and the movable contact member 67 is rotated around a fixed axis by the operation of an opening-and-closing mechanism 72 to move the contact 65 provided of the one end of the movable contact member 67 from or toward the contact 65 provided on the one end of the stationary contact member 64 for opening or closing the circuit interrupter. Furthermore, the movable contact member 67 is constructed to urge the contact 66 toward the contact 65 for contacting them by a spring 76 and so that a contact pressure and a wipe on the contacts in a closed condition are obtained. The drawer contact members 63 and 70 are mounted respectively on the one ends of the stationary contact members 64 and 69 as the terminals of the main body side and are effected to connect respectively the terminals 62 and 71 as the terminals of the mounting frame side to the terminals 64 and 69 by using the spring force of the contacting springs 75.

FIG. 17 shows the condition of the interrupter main body 60 drawn from the connecting position to the interrupting position. In this position, the stationary contact member 64 and the main body terminal 69 as terminals of the main body side are separated respectively from the terminals 62 and 71 on the mounting frame side, and the circuit interrupter is in the condition cutoff from the power source and the load.

For such a drawer-type circuit interrupter the following functions are required while in the connecting position and the disconnecting position;

First, in the connecting position the desired contact pressure and wipe maintaining a stabilized contacting condition on the contacting portions of the terminals of the interrupter body side and the terminals of the mounting frame side.

Second, in the disconnected position it is necessary to obtain the desired insulating distances between the terminals of the interrupter body side and the terminals of the mounting frame.

In relation to such requirements regarding the connecting position, such requirements have been satisfied the upper terminal in conventional drawer-type circuit interrupters by providing the drawer contact members 63. That is, in the disconnecting position shown in FIG. 17 the distance (A) of the drawer contact members 63 for connecting the stationary contact member 64 and the terminal 62 by gripping them is less than the thickness (B) of the terminal 62. In the connecting position, the distance of the drawer contact members 63 is equal to the thickness (B), and thereby each of the wipes of the upper and lower drawer contact members 63 is indicated as follows;

$$(B-A) \div 2$$

At this time, the contact pressure is obtained by the compression spring 75.

In the construction of such conventional drawer-type circuit interrupters, the following problems have been found;

(1) There are two contacting portions 73 and 74 in series on the drawer contact members 63 contacting the terminal 62 and the stationary contact member 64. Therefore, when the electric current flows in the circuit interrupter, Joule heat is generated at these contact portions and the drawer contact members 63 themselves. Furthermore, the normally relatively large next generated at the contacts 65 and 66 which are the open and close contacting portions can not escape easily to the normally relatively lower temperature external lines connected with the terminals 62 of the mounting frame side. Thus, the temperatures at any portions are increased and the rated current values are restricted.

(2) The bulk of the whole drawer-type circuit interrupter is increased because the depth of the circuit interrupter is increased due to the provision of the drawer contact members 63 and the extension of the stationary contact members 64 for mounting the drawer contact members 63.

SUMMARY OF THE INVENTION

Thus, the object of the present invention is to overcome these above mentioned drawbacks and to provide a drawer-type circuit interrupter capable of handling an increase in the rated current value with a decrease in Joule heat while the bulk of the whole circuit interrupter can be decreased by shortening the depth thereof.

Therefore, in order to achieve the above mentioned object, in accordance with present invention, a drawer-type circuit interrupter is constructed with an interrupting main body having a first contact member having an open-and-close contact portion, an open-and-close operation mechanism for operating said first contact member, a second contact member and a mounting frame having the external line connect terminals, said circuit interrupter characterized in that the second contact member is a movable-type provided with an open-and-close contact portion that is contactable with and separable from the first contact member on one end thereof and a drawer contact portion contacting with an external line connect terminal on the other end thereof, and further in that when the interrupter body is in a connected position the drawer contact portion on the other end of said second contact member and said external line connect terminal are contacted.

For the drawer-type circuit interrupter of the present invention, each only one conductor and contact portion is positioned in series between the open-and-close contact portion and the external line connect terminal to minimize them. That is, a conductor is the second contact member and a contact portion is achieved by the second contact member and the external line connect terminal. Further, the contact pressure and the wipe for the second contact member and the external line connect terminal portion are achieved by the compression spring.

Furthermore, for the drawer-type circuit interrupter of the present invention, the second contact member is loosely fitted and the contact pressure is respectively supplied independently to the contact between the first contact member and the second contact member and to the contact between the second contact member and the external line connect terminal portion, so that if there is a change in the contact at one contact portion, such a change barely effects the contact of the other contact portion so that stability is maintained. The contact pressure and the wipe for the open-and-close contact portion of the first and second contact members are achieved by the compression spring.

Also, for the drawer-type circuit interrupter of the present invention, when the open-and-close contact portion is closed or opened, the second contact member does not move, and when the second contact member and the external line contact terminal portion is closed or opened, even if the second contact member rotates the movement for the one end of the second contact member is short and contact stability is maintained. Furthermore, the contact pressure and the wipe on the open-and-close contact portion for the first and second contact members can be achieved by the compression spring forcing the first contact member.

For the drawer-type circuit interrupter of the present invention, by having the second contact member and the external line connect terminal contact at two points, contact resistance can be reduced and Joule heat generation can be limited. When a short-circuit current flows, the electromagnetic repulsion force for effecting the separation of the second contact member from the external line connect terminal is proportional to the square of the electric current, so that the electric current is divided to flow to each of the contact points due to the two point contact, and the sum of the electromagnetic repulsion forces at each of the contact points is less than that for one point contact.

DESCRIPTION OF THE DRAWINGS

The invention will be explained in conjunction with the illustrative embodiments shown in the accompanying drawings, in which.

DESCRIPTION OF PREFERRED EMBODIMENTS OF THE INVENTION

In FIGS. 1 to 6 of the drawings, there is shown a first embodiment of a drawer-type circuit interrupter in accordance with the present invention, as shown in these drawings the drawer-type circuit interrupter of the present invention is mainly constituted from a mounting frame 1 including a molded insulation 3 and external line connecting terminals 4, and an interrupter body 2 including a contact means 5 and an open-and-close operating mechanism 6.

Figure 1:
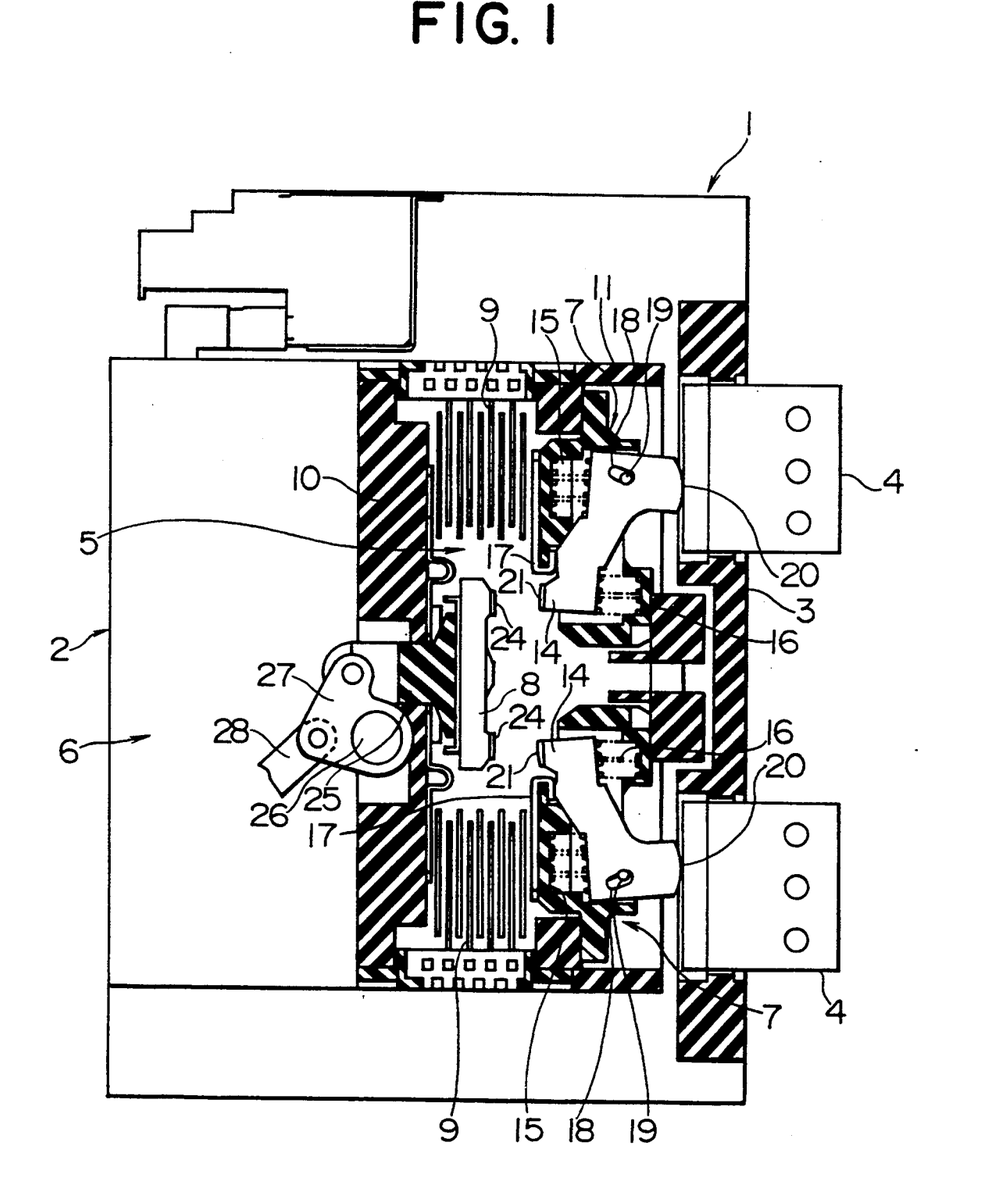
FIG. 1 is a side sectional view of a first embodiment of a drawer-type circuit interrupter in accordance with the present invention showing the interrupter body connected to the mounting frame with the interrupter body in an open condition.

The mounting frame 1 of the drawer-type circuit interrupter of the present invention is secured on a structure (not shown), and the interrupter body 2 is provided capable of moving horizontally in the drawings along guide rails (not shown) provided on the mounting frame 1. The upper and lower external line connecting terminals 4 secured on the molded insulation 3 of the mounting frame 1 are respectively connected to a power source and a load.

The interrupter body 2 is constructed from the contact means 5 and the open-and-close operating mechanism 6 not showing its detailed mechanism. The contact means 5 is constructed from a first contact member 8, two pairs of second contact units 7 and an arc extinction means 9, the first contact member 8, the second contact units 7 and the extinction means 9 being received in a casing formed from the molded insulations 10 and 11, and the second contact units 7 being mounted on the molded insulation 11 in symmetry vertical.

Figure 4:
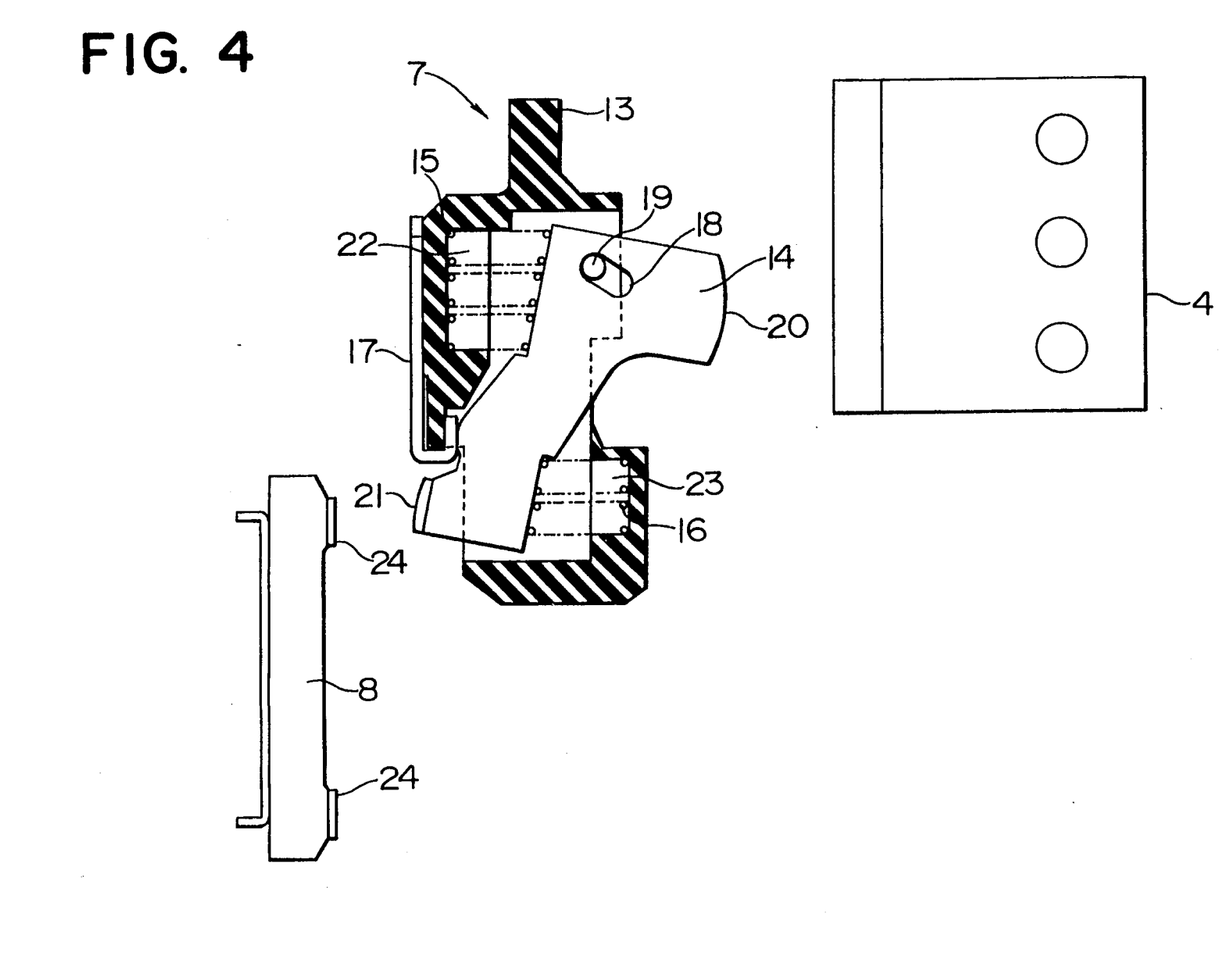
FIG. 4 is a side sectional view of the second contact member unit.
Figure 5:
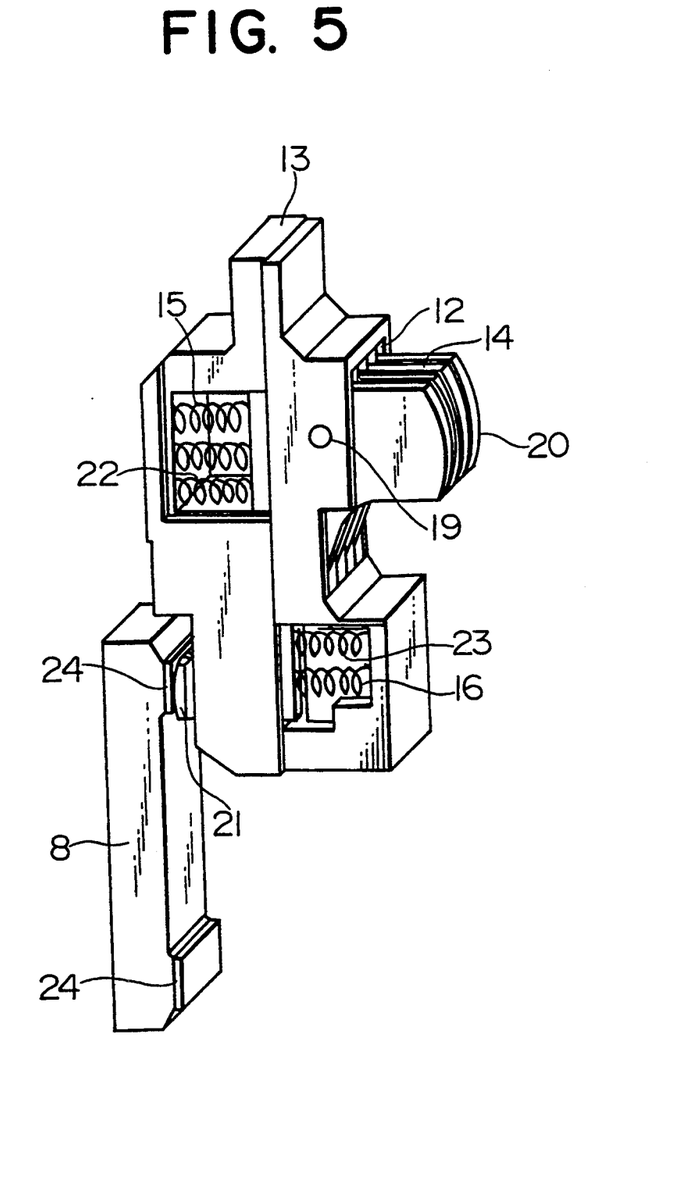
FIG. 5 is a partially cut side sectional view of the second contact member unit.
Figure 6:
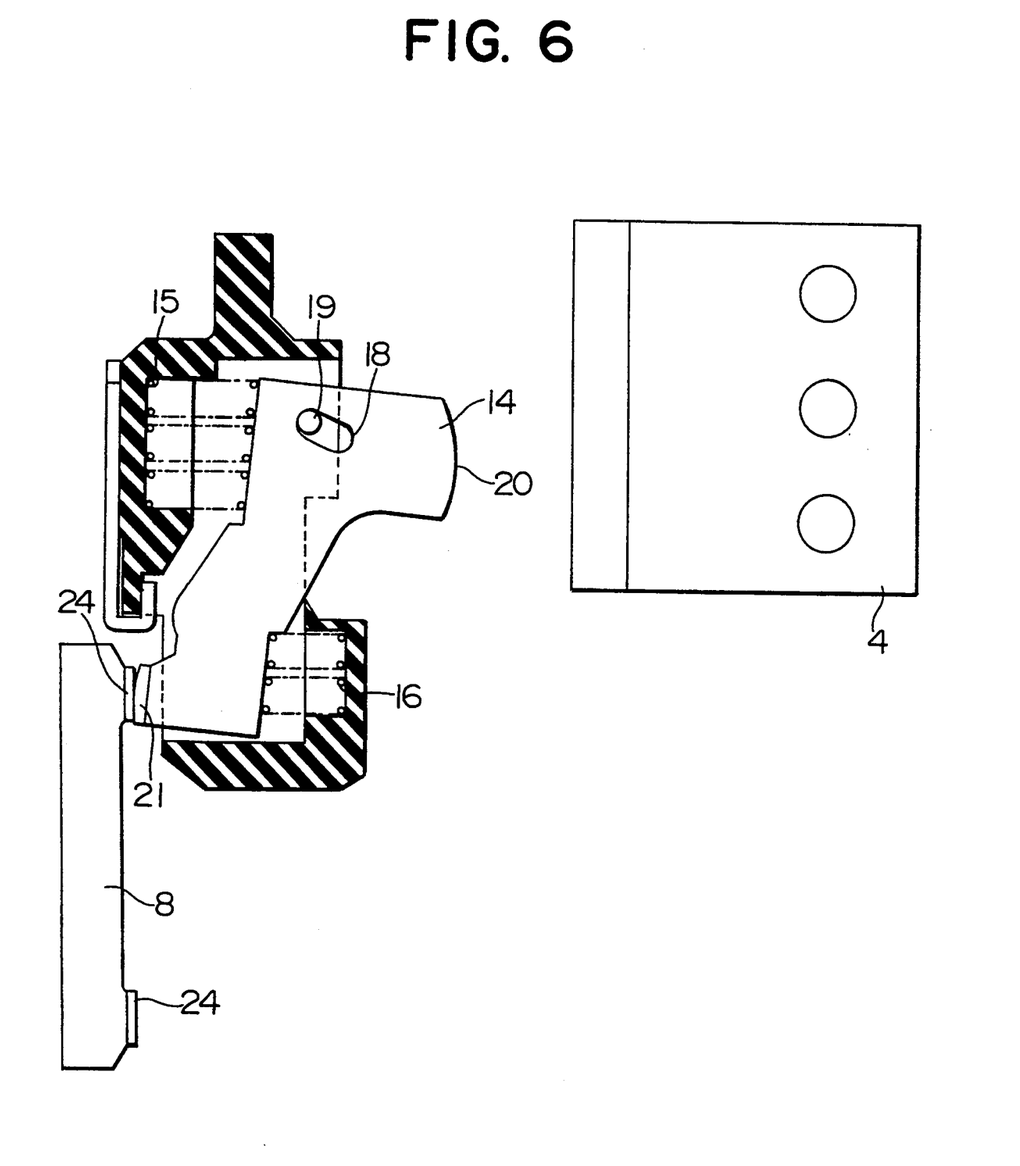
FIG. 6 is a side sectional view of the drawer-type circuit interrupter of the first embodiment showing the interrupter body in a disconnected condition with regard to the mounting frame and the interrupter body in the closed condition.

As shown in FIGS. 4 and 5, each of the second contact units 7 is constructed from a second contact member 14, a first compression spring 15, a second compression spring 16 and an arc runner 17 provided on a molded insulation box 13 mounted on the molded insulation 11 and having a partition 12. The second contact members 14 can also be constructed as a single member in accordance with their thickness and the rated current. The second contact member 14 is formed in the configuration shown in the drawings and is loosely fitted without being secured to the partition 12 or the molded insulation box 13. As shown in the drawings, a slot 18 is provided on the upper portion of the second contact member 14 and a pivot 19 extending through the partition 12 and the molded insulation box 13 is inserted therethrough. The diameter of the pivot 19 is relatively less than the length and width of the slot 18. Thus, the second contact member 14 can be moved within the ranges in which its outer configuration is limited by the partition 12 and the molded insulation box 13 and the peripheral edge of the slot 18 is limited by the pivot 19.

The drawer contacting portion 20 is also formed in an arc shape or semicircular shape on the upper right end portion of the second contact member 14 as the portion which contacts with the external line connect terminal. Furthermore, a second contact 21 is secured on the lower left end portion of the second contact member 14, and a first compression spring 15 is provided between the upper left end portion of the second contact member 14 and a concave portion 22 formed on the molded insulation box 13. Therefor, the upper portion of the second contact member 14 is forced toward the right. A second compression spring 16 is also provided between the lower right end portion of the second contact member 14 and a concave portion 23 formed on the molded insulation box 13 and thus the lower portion of the second contact member 14 is forced toward the left.

Referring again to FIG. 1, each of the first contacts 24 contactable with the second contacts 21 is provided respectively on both ends of the first contact member 8 of the contact means 5 for the interrupter body 2. The first contact member 8 is mounted on one end of an operating rod 25 formed from the molded insulation material and is capable of freely moving horizontally in the drawing by the guide members (not shown). The other end of the operating rod 25 is rotatably connected with a lever 27 secured on a shaft 26 of the open-and-close operating mechanism 6. The lever 27 is connected with a link 28 as a part of the open-and-close operating mechanism 6, and thus the lever 27 is rotated in relation to shaft 26 and the operating rod 25 is slidably moved horizontally by the open-and-close operation of the open-and-close operating mechanism 6.

Figure 2:
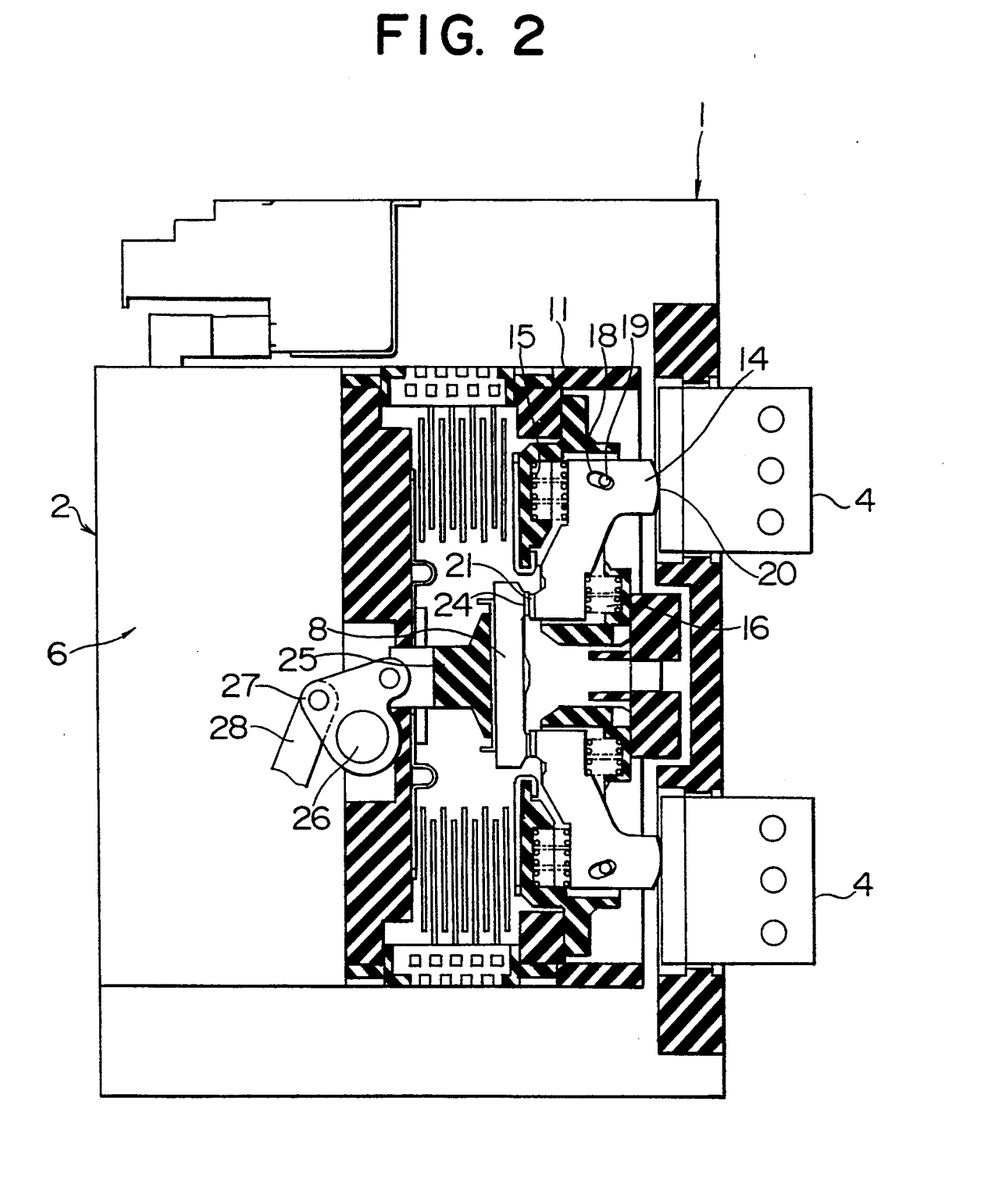
FIG. 2 is a side sectional view of the drawer-type circuit interrupter of FIG. 1 in a closed condition.
Figure 3:
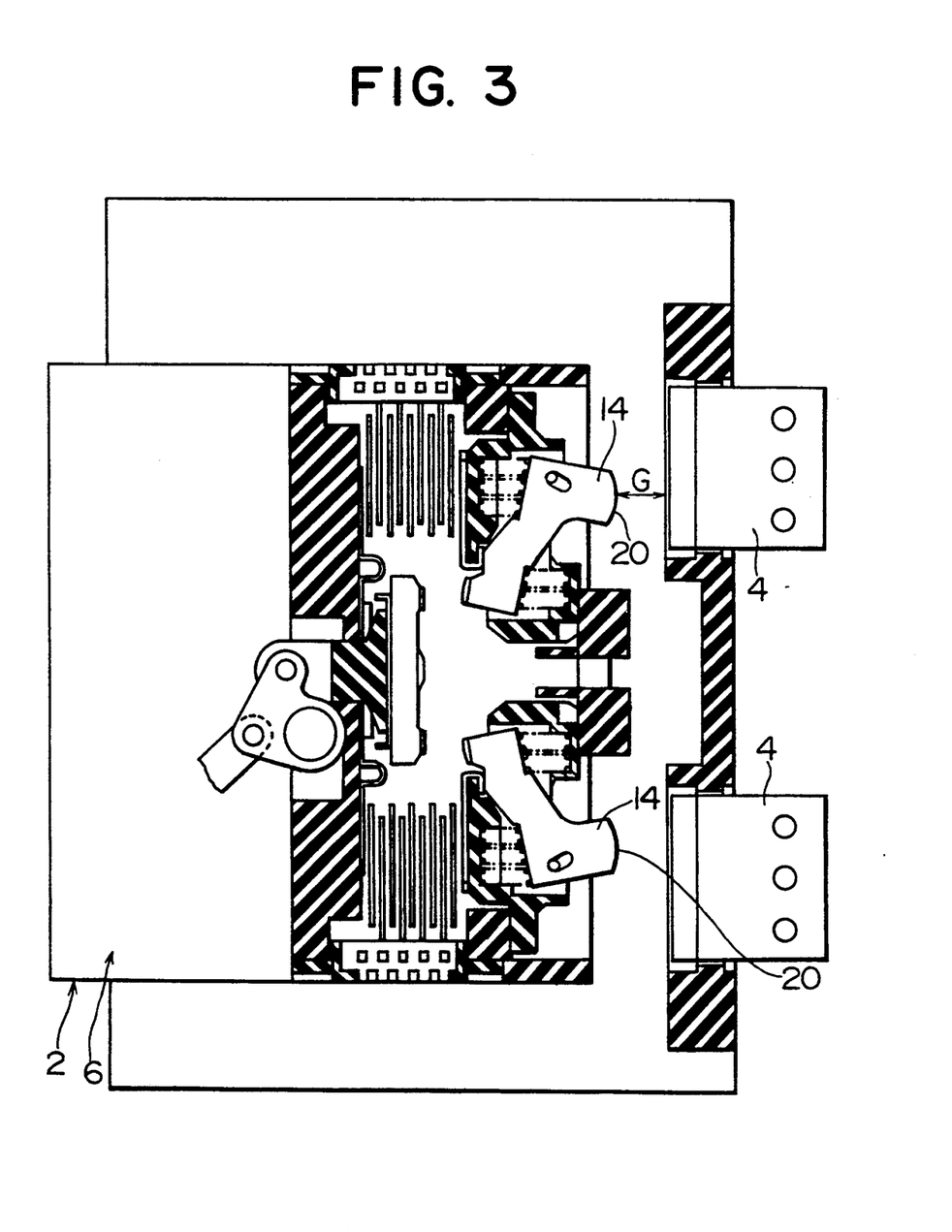
FIG. 3 is a side sectional view of the drawer-type circuit interrupter of FIG. 1 showing the interrupter body in a disconnected condition with regard to the mounting frame and the interrupter body in an open condition.

In FIGS. 1 and 2, the interrupter body 2 is shown in a connected position, and in FIG. 3 it is shown in a disconnected position. Thus, in FIGS. 1 and 2, the drawer contact portions 20 of the second contact member 14 are urged into contact with the external line connecting terminals 4 by the spring force of the first compression springs 15 to establish an electrical connection. In FIG. 3 the external line connect terminals 4 and the second contact members 14 are separated and electrically insulated.

The open-and-close operation of the drawer-type circuit interrupter the present invention constructed described above will be explained as follows.

In FIG. 1, when a conventionally constructed open-and-close operating mechanism 6 is first operated to the "closed" condition, the operating rod 25 and the first contact member 8 are moved to the right in the drawings through the lever 27, the first contacts 24 contact with the second contacts 21 to assume the condition shown in FIG. 2, thereby closing the electric circuit At this time, the portions in the vicinity of the second contacts 21 secured on the second contact members 14 are moved respectively to the right against the second compression springs 16. These moving distances are the amounts of wipe for the contacts. The portions in contact with the arc runners 17 in the vicinity of the second contacts 21 of the second contact members 14 are parted from the arc runners 17, and the semicircular-shaped drawer contact portions 20 of the second contact members 14 move slightly on the outer wire contact terminals 4 as the contact portions contact with the external line connect terminals 4.

Then, in FIG. 2 which show the drawer-type circuit interrupter of the present invention in a closed condition as mentioned above, when the open-and-close operating mechanism 6 is operated to the "open" condition, the operating rod 25 and the first contact member 8 are moved to the left in the drawing through the lever 27. As a result, the first contacts 24 are parted from the second contact 21 into the condition as shown in FIG. 1 to thereby open the electric circuit. At this time, the portions in the vicinity of the second contacts 21 secured on the second contact members 14 are moved respectively to the left by the second compression springs 16 and are stopped by combing into contact with the one end of the arc runners 17.

During such "open" and "closing" operations, even if the portions in the vicinity of the second contacts 21 secured on the second contact members 14 are moved in the horizontal direction, the points of contact between the drawer contact portions 20 of the second contact members 14 and the external line connect terminals 4 only move a little. This is, because the second contact members 14 are supported loosely and neither ends there is not effected by the movement of the other due to the separate forces effected on the upper and lower ends of the second contact members 14. Even if the points of contact between the drawer contact portions 20 of the second contact members 14 and the external line connect terminals 14 are moved slightly, the drawer contact portions 20 are formed in an arc-shape or semicircular shape so that they can slide on the contacting surfaces of the external line connect terminals 4 and maintain stabilized contact conditions.

Further, the drawer operation of the drawer-type circuit interrupter made in accordance with the present invention is carried out as follows.

That is, the drawer operation of the drawer-type circuit interrupter of the present invention is effected with the circuit interrupter in an "open" condition for safety.

First, in FIG. 1, when a drawout operation mechanism (not shown) of the drawer-type circuit interrupter of the present invention is operated, the interrupter body 2 is moved to the left. With this movement the contact portions in the vicinity of the second contact members 14 and the external line connect terminals 4 are moved respectively to the right by the spring force of the first contact compression springs 15 to engage the left side edges of the slots 18 of the second contact members 14 with the pivots 19 for stopping the movements of the second contact members 14. This time is a critical point in the contact of both contact portions, and this movement of the circuit interrupter is the wipe of the second contact members 14 upon the contact positions. Furthermore, by continuing with the drawing operation of the interrupter body 2 the necessary insulating distances (G) are ensured between the external line connect terminals 4 and the drawer contact portions of the second contact members 14 so that the disconnected position shown in FIG. 3 can be obtained. In this disconnected position shown in FIG. 3 the open-and-close operation of the interrupter body 2 is still possible and in FIG. 6 the main elements in the closed condition thereof are shown. The insert operation is the reverse of the drawout operation.

Figure 7:
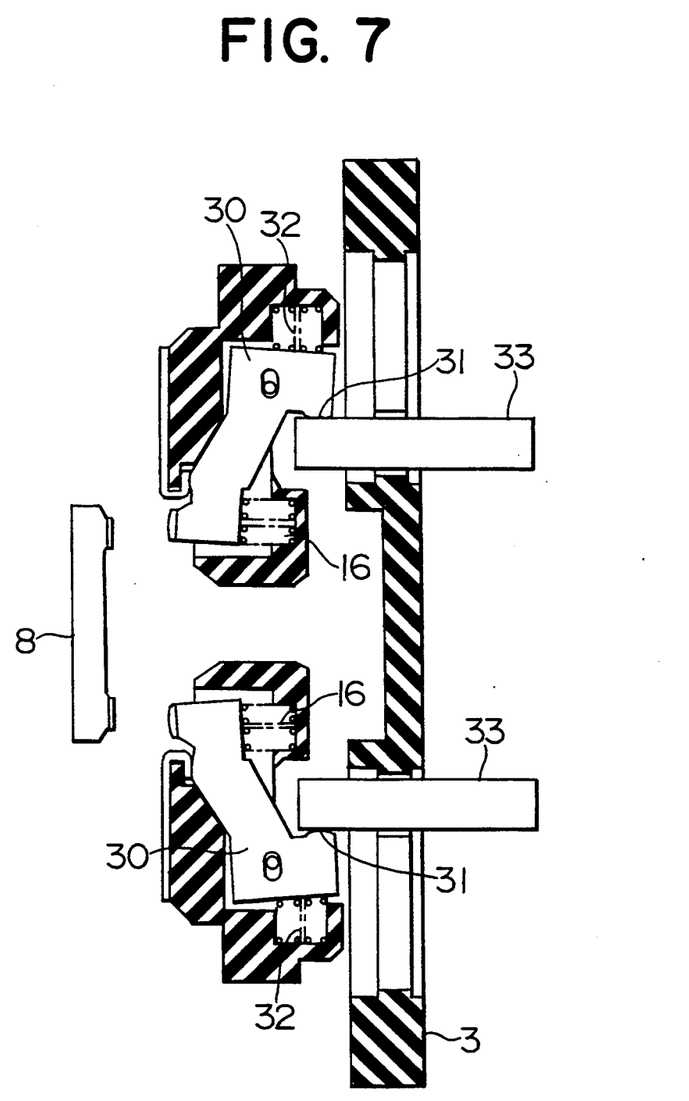
FIG. 7 is a side sectional view of a drawer-type circuit interrupter of a second embodiment showing the interrupter body connected to the mounting frame with the interrupter body in an open condition.

A second embodiment of the drawer-type circuit interrupter for the present invention is shown in FIG. 7. In the above described first embodiment, the contact pressures of the second contact members 14 are effected in the direction of movement of the interrupter body 2 towards the outer wire contact terminals 4, but in this second embodiment the drawer-type circuit interrupter is constituted to urge the respective drawer contact portions 31 of the second contact members 30 in a direction perpendicular to the direction of movement of the circuit interrupter imparted by the contact compression springs 32. Therefor, the contact pressures are effected in these directions relative to the external line connect terminals 33 without imparting any contact pressure in the drawing direction of the circuit interrupter at the connecting position.

Figure 8:
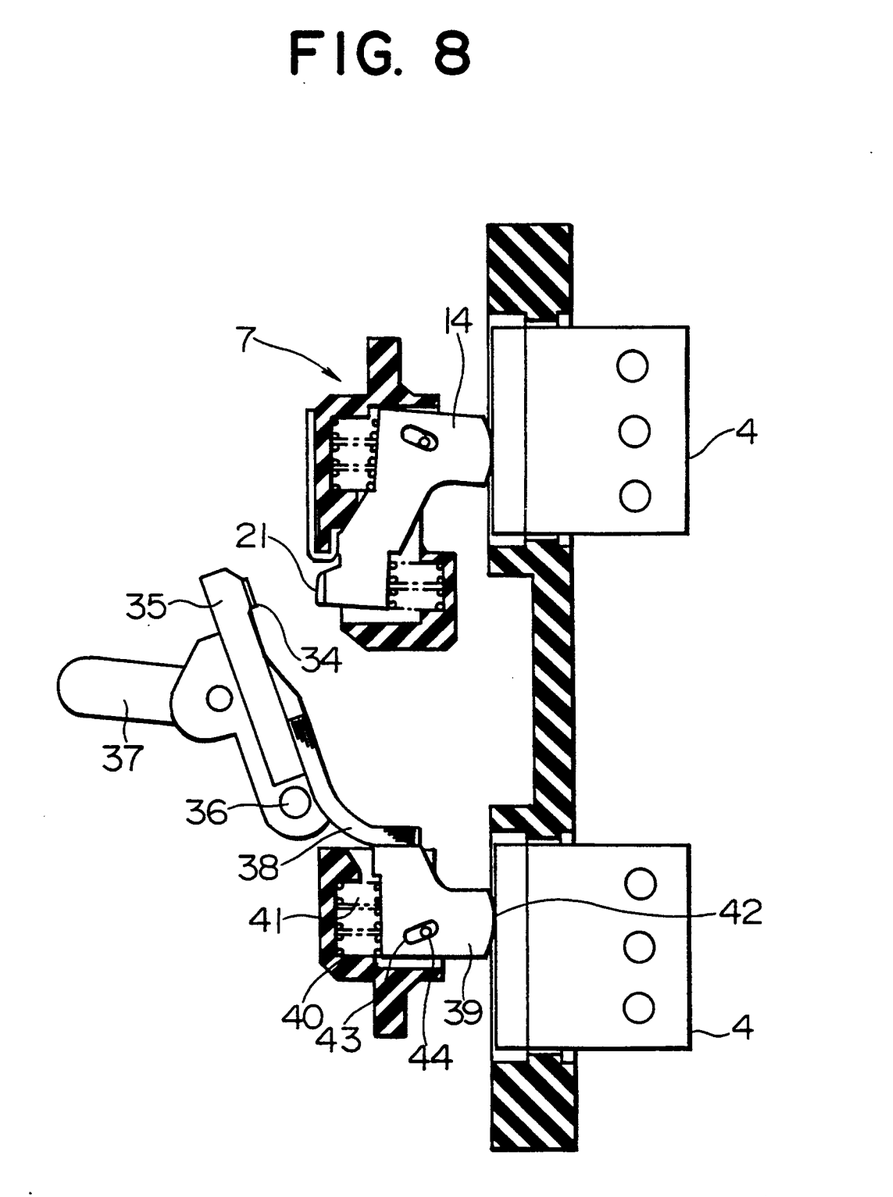
FIG. 8 is a side sectional view of a drawer-type circuit interrupter of a third embodiment showing the interrupter body connected to the mounting frame with the interrupter body in an open condition.

A third embodiment of the drawer-type circuit interrupter for the present invention is shown in FIG. 8. In the above mentioned first embodiment, two open-and-close contact portions are provided for using two sets of the second contact members, but in this third embodiment only one open-and-close contact portion is provided to use a set of the second contact units. In the constitution of the third embodiment the external line connect terminal 4 and the upper second contact member unit are the same as those in the first embodiment. A first contact member 35 provided with a first contact 34 is pivotably supported by an axis 36 and is connected with the open-and-close operating mechanism (not shown) through an operating rod 37. A lower drawer contact member 39 is provided to be received in a molded insulating box 40 at the interrupter body associated with the lower external line connecting terminal 4. A flexible conductor 38 is secured on the one end of the lower drawer contact member 39 and the other end of the first contact member 35. The drawer contact portion 42 on the other end of the lower drawer contact member 39 is formed in an arc-shape or semicircular shape and is urged in the direction of the external line connecting terminal 4 by a compression spring 41. Furthermore, a pivot 44 is inserted through a slot 43 formed on the central portion of the lower drawer contact member 39.

Thus, the operation of the third embodiment is substantially the same as the first embodiment except that the first contact member 35 is rotated clockwise or counter clockwise relative to the axis 36 through the operating rod 37 by the operation of the open-and-close operating mechanism for contacting or separating the contacts 21 and 34.

Figure 9:
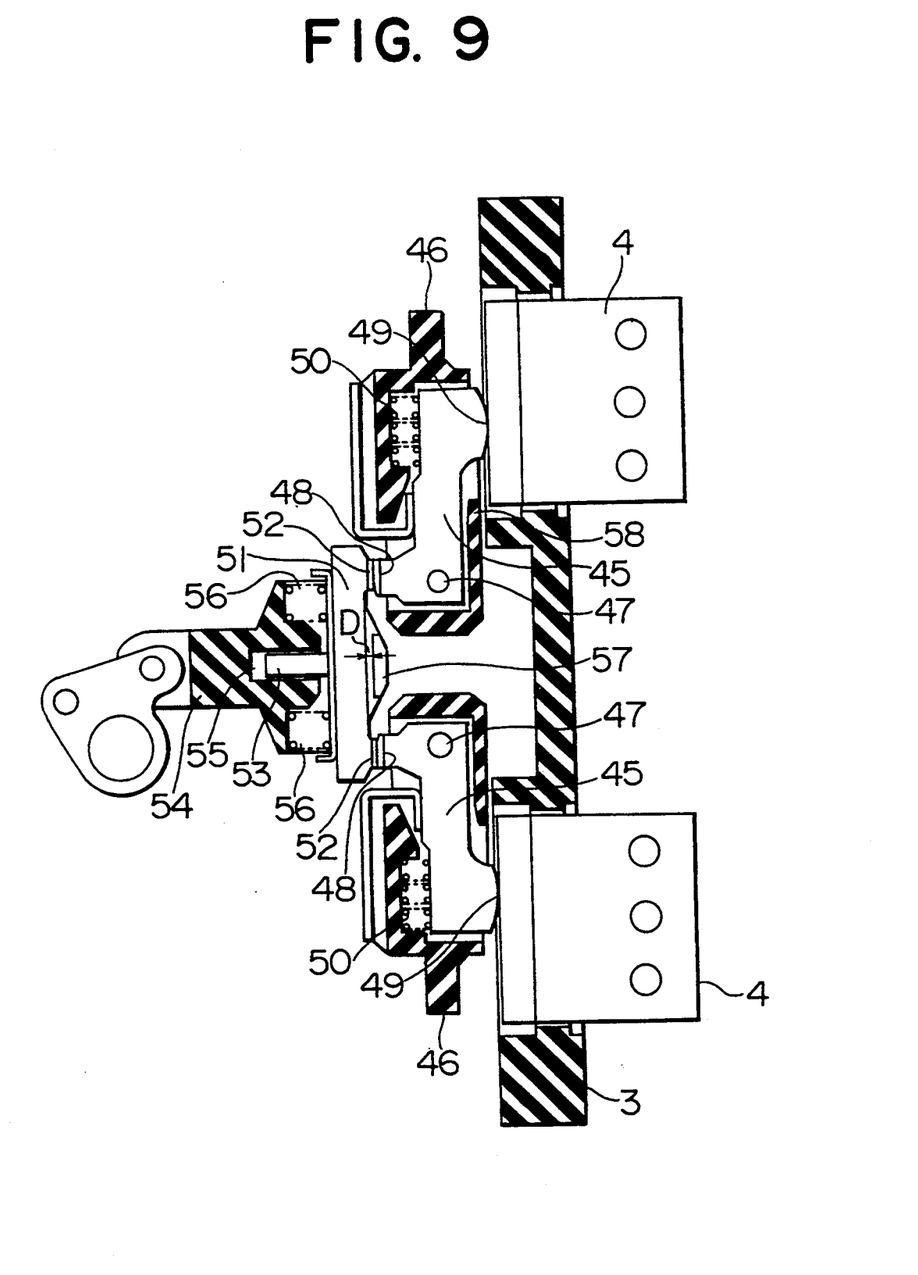
FIG. 9 is a side sectional view of a drawer-type circuit interrupter of a fourth embodiment showing the interrupter body connected to the mounting frame with the interrupter body in a closed condition.

A fourth embodiment of the drawer-type circuit interrupter for the present invention is shown in FIG. 9. In the above described first embodiment, the second contact member 14 is loosely received in the molded insulation box 13 and fitted loosely on the pivot 19, but in this fourth embodiment the second contact member 45 is supported rotatably on the shaft 47 provided on the molded insulation box 46. The second contact 48 is provided on the one end of the second contact member 45, and the drawer contact portion 49 is formed in an arc-shape or semicircular shape and is urged toward the outer wire connect terminal 4 by the compression spring 50. The first contacts 52 capable of contacting with and separating from the second contacts 48 are provided on both ends of the first contact member 51, and a guide rod 53 is also provided on the central portion thereof opposite the securing surface for the first contacts 52. The guide rod 53 is fitted in a recess 55 formed on an operating rod 54 connected with the open-and-close operating mechanism (not shown) to guide the first contact member 51 in the direction for contacting and separating the first and second contacts 52 and 48. Furthermore, the first contact member 51 is forced into the direction for contacting and separating the first contacts 52 and the second contacts 48 by the compression springs 56 provided between the operating rod 54 and the contact member 51. The shafts 47 pivotably supporting the second contact member 45 are provided in the vicinity of the second contacts 48 on the operating line of the closing pressures by the compression springs 56 or the opposite side slightly from the drawer contact portions 49 relating to such operating line.

To explain about the operation of the fourth embodiment, in the closed condition, a space (D) is formed between the first contact stopper 57 which moves together with the operating rod 54 and the first contact 51. Now, to effect the opening operation by operating the open-and-close operating mechanism, the operating rod 54 is moved to the left, and the first contact member 51 is held in the closed position by the compression spring 56. When the operating rod 54 is moved further to the left, the first contact member 51 engaged with the first contact stopper 57 is moved to the left together with the operating rod 54, and the first contact 52 is separated from the second contact 48 to cause an open condition. Next, to effect the closing operation, the operating rod 54 is moved to the right during the closing operation together with the first contact member 51, and the first contact 52 contacts with the second contact 48.

Further moving the operating rod 54 by the distance (D) after the contact of both the first and second contacts 52 and 48 completes the closing operation. This distance (D) is amount of wipe on the contacts. For this closing operation, the operating force effected on the second contact member 45 is almost totally absorbed by the shaft 47, so even if a force for rotating the second contact member is applied, a satisfactory contact condition between the drawer contact portions 49 and the external line connect terminals 4 can be maintained, because the application thereof is in a direction that increases the contact pressure of the drawer contact terminals 49.

Then, when the circuit interrupter is operated to be drawn out after the opening condition of the circuit interrupter, the interrupter body is moved to the left. For example, this can be described in regard to the upper second contact members 45 where they are rotated in a clockwise direction, the central portions of the second contact members 45 engage with the outer end portions 58 of the molded insulation box 46 to stop their rotation. When the interrupter body is moved further to the left, the drawer contact portions 49 and the external line contact terminals 4 are separated to assume a disconnected condition.

The fifth embodiment of the drawer-type circuit interrupter for the present invention is shown in FIGS. 10 to 15. As shown in these drawings, in this fifth embodiment second contact members 100 are provided with protrusions 101 and concave portions 102 are formed on the external line connecting terminals 103 for receiving the protrusions 101 in the connecting position. These protrusions 101 and concave portions 102 are enlarged in FIG. 11. When viewed from the side it can be seen that the protrusion 101 is formed in a semicircular shape and the opening of the concave portion 102 is formed in a trapezoidal shape larger than the bottoms thereof, and so the protrusion 101 of semicircular shape contacts at two points with the inclined sides of the concave portions 102.

Figure 11:
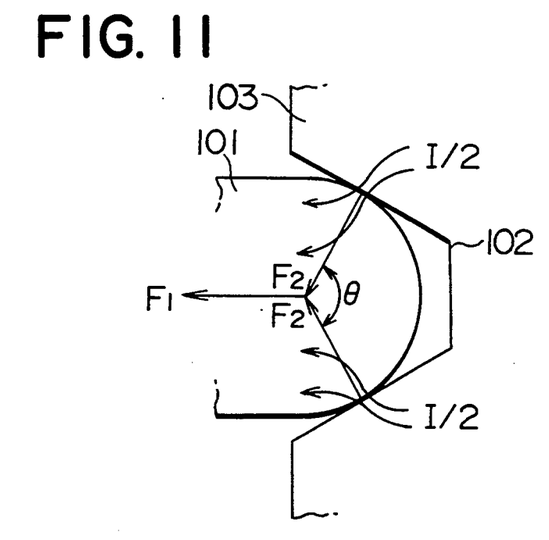
FIG. 11 is an enlarged partial view of the contacting portion of the second contact member and the external line connect terminal of the fifth embodiment in FIG. 10.

In this way, with the contact of the protrusion 101 at two points, the contact resistance is smaller than the contact with one point of the first embodiment and thus the heat generation can be reduced so that current capacity can be increased with the same current flow.

Figure 12:
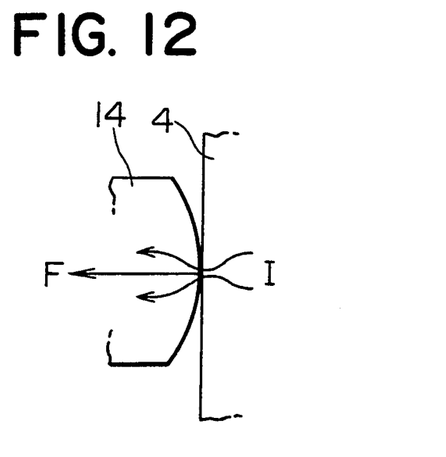
FIG. 12 is an enlarged partial view of the contacting portion of the second contact member and the external line connect terminal of the first embodiment.

Further, when a large current flow, the force for separating the second contacting member 100 from the external line connecting terminal 103 by the electromagnet repulsions generated at the contacting points is reduced to less than that of the first embodiment. Referring to FIGS. 11 and 12, it can be seen that since electromagnetic repulsion is proportioned to the square of the current, the electromagnetic repulsion F2 for each of the contact points is ¼ of the electromagnetic repulsion F for the first embodiment when current flow (I/2) is equal at the two contact points.

As shown in FIG. 11, if it is assumed that for the electromagnetic repulsion F2 at the two contact points the composed force effected in the direction for separating the second contacting member 100 from the external line connecting terminal 103 is F1, then the force F1 can be expressed by the following formula:

$$F1 = 2 \cdot F2 \cos(\theta/2)$$

The electromagnetic repulsion can be represented by the following formula:

$$F2 = \tfrac{1}{4} \cdot F$$

Thus, the composed force can be represented with the following formula:

$$F1 = \tfrac{1}{2} \cdot F \cos(\theta/2)$$

In this fifth embodiment, the composed force F1 effected to separate the second contacting member 100 from the external line connecting terminal 103 is reduced to less than the operating force F effected to separate the second contact member 14 from the external line connecting terminal 4 in the first embodiment. Where, $\theta$ is the angle formed between each electromagnetic repulsions generated on two contact points, for example the angle $\theta$ is 120°. The composed force F1 is expressed as follows:

$$F1 = F2 = \tfrac{1}{4} \cdot F$$

When the angle $\theta$ is 150°, the composed force F1 is expressed as follows:

$$F1 \approx \tfrac{1}{2} \cdot F2 = \tfrac{1}{8} \cdot F.$$

Thus, when the first compression spring having the same load as the first compression spring 15 in the first embodiment is used in this fifth embodiment, it can resist the electromagnetic repulsion generated by larger currents and thus current flow ability can be increased.

Figure 10:
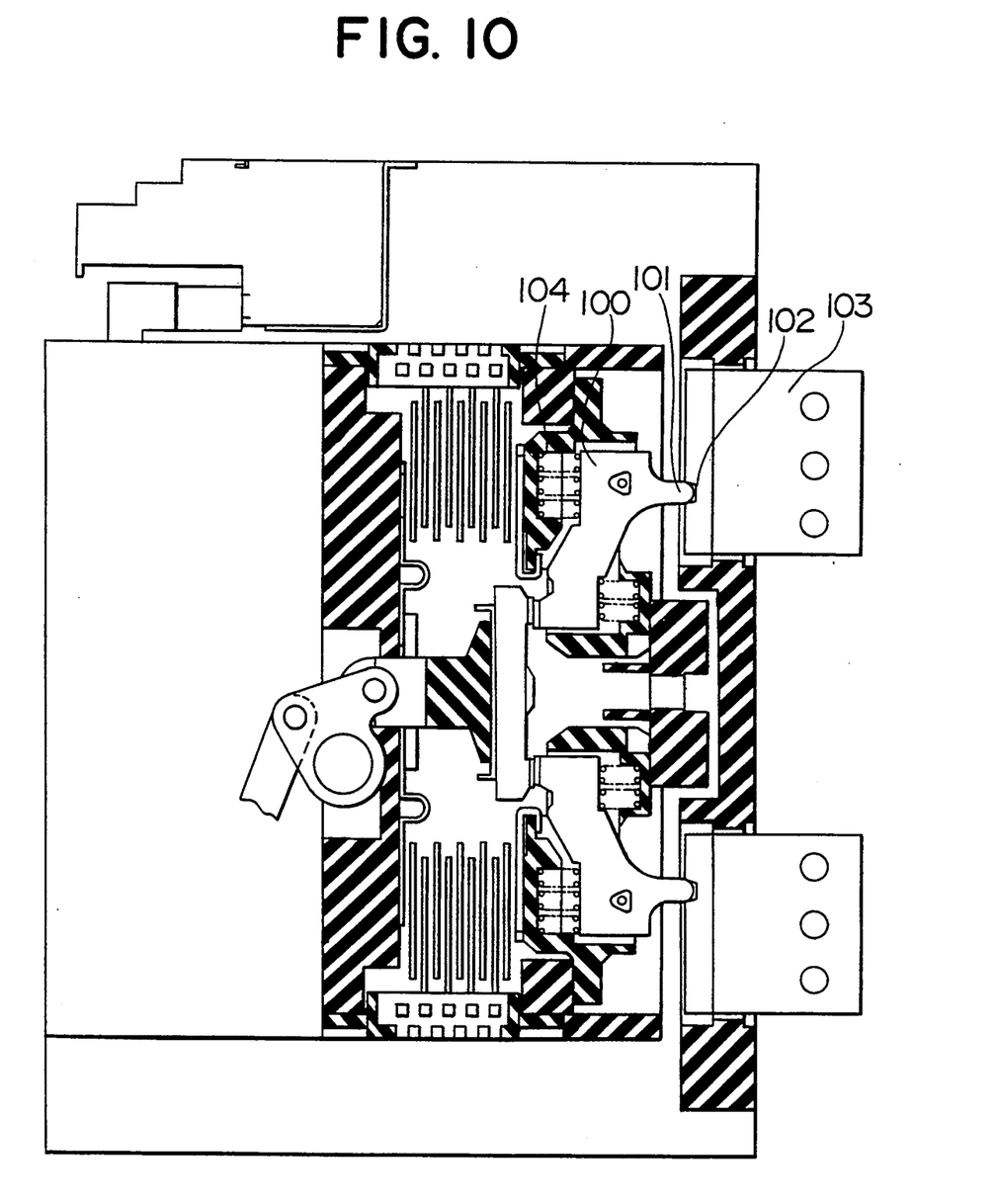
FIG. 10 is a side sectional view of a drawer-type circuit interrupter of a fifth embodiment showing the interrupter body connected to the mounting frame with the interrupter body in a closed condition.
Figure 13:
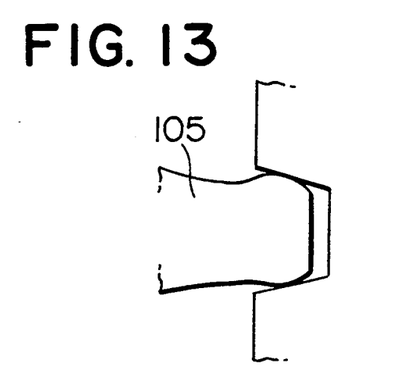
FIG. 13 is an enlarged partial view of a contacting portion of a variant of the fifth embodiment.
Figure 14:
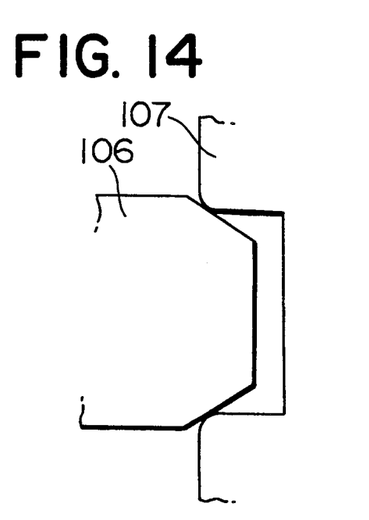
FIG. 14 is an enlarged partial view of a contacting portion of another variant of the fifth embodiment.
Figure 15:
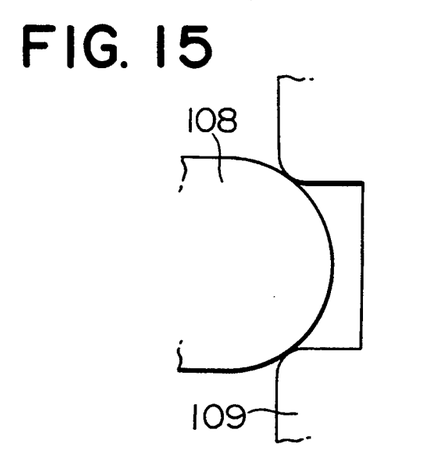
FIG. 15 is an enlarged partial view of a contacting portion of a further variant of the fifth embodiment.

Although in the fifth embodiment shown in FIGS. 10 and 11, the end portion of the protrusion of the second contacting member is formed in a semicircle, the contacting member may also be formed with two arc portions as shown by the second contact member 105 in FIG. 13 with two linear portions formed on the protrusion of the second contact member 106 and the external line connecting terminal 107 is formed with the arc portions or rounded portions that contact with the linear portions as shown in FIG. 14, or with the external line connecting member 109 is formed with two arc portions or rounded portions that contact with the protrusion of the second contacting member 108 as shown in FIG. 15. Although not shown in the drawings, the second contacting member can be provided with a concave portion and the external line connecting terminals can be provided with protrusions in the reverse of the contacting members shown in FIGS. 11, 13, 14 and 15.

That is, by having two point contacts for at least one point of contact between the second contact member and the external line connecting terminal. increases in temperature can be restricted and the electromagnetic repulsion force for separating the second contact member therefrom can be limited furthermore, the electromagnetic repulsion force can be preferably restricted by the provision of the arc-shaped (or rounded) portions on at least the second contact member or the external line connecting terminal and by ensuring that the target line at each of the contact points does not form any right angles with the direction of movement of the circuit interrupter during the drawing out or insertion operations.

As mentioned above, in the drawer-type circuit interrupter in accordance with the present invention, the conductive members and the drawer terminal members for the contact means can be constituted with very few parts, and as a result the Joule heat generated by the flow of electric current can be reduced and the heat generated on the open-and-close contact portions can easily escape to the wire portions for reducing the amount of heat in the interior of the circuit interrupter, thus allowing the rated current to be set to a larger value. Also, the depth of the drawer circuit interrupter can be reduced to decrease the total volume of the circuit interrupter and to reduce the number of the parts used.

Thereby, a drawer-type circuit interrupter with little powerloss, small size, large capacity and reduced resources can be provided so that the control panels and power rooms can be reduced in size.

What is claimed is:

1. A drawer-type circuit interrupter constructed with an interrupter body (2) having a first contact member (8, 35, 51) having an open-and-close contact portion (24, 34, 52), an open-and-close operation mechanism (6) for operating said first contact member (8, 35, 51) and at least one second contact member (14, 30, 45, 100, 105, 106, 108), and a mounting frame (1) having external line connect terminals (4, 33, 103, 107, 109), said circuit interrupter characterized in that the second contact member (14, 30, 45, 100, 105, 106, 108) is a movable-type provided with an open-and-close contact portion (21, 48) that is contactable with and separable from the first contact member (8, 35, 51) on one end thereof and a drawer contact portion (20, 31, 49) contactable with and separable from an external line connect terminal (4, 33, 103, 107, 109) on the other end thereof, and further in that when the interrupter body (2) is in a connected position the drawer contact portion (20, 31, 49) on the other end of said second contact member (14, 30, 45, 100, 105, 106, 108) contacts an external line connect terminal (4, 33, 103, 107, 109).

2. The drawer-type circuit interrupter as claimed in claim 1, wherein said second contact member (14, 30, 45, 100, 105, 106, 108) is forced by a compression spring (15, 32, 50, 104) into contact with external line connect terminal (4, 33, 103, 107, 109) at said other end of the second contact member (14, 30, 45, 100, 105, 106, 108).

3. The drawer-type circuit interrupter as claimed in claim 1 or 2, wherein said second contact member (14, 30, 100, 105, 106, 108) is loosely supported and is forced by a compression spring (16) into contact with said first contact member (8, 35) at said open-and-close contact portion (21) thereof.

4. The drawer-type circuit interrupter as claimed in claim 1 or 2, wherein the second contact member (45, 105, 106, 108) is rotatably mounted in the vicinity of the open-and-close contact portion (48) at said one end, and said first contact member (51) is forced by a compression spring (56) into contact with said one end of the second contact member (45, 105, 106, 108).

5. The drawer-type circuit interrupter as claimed in claim 1 or 2, wherein the second contact member contacts (14, 30, 45, 100, 105, 106, 108) an external line connect terminal (4, 33, 103, 107, 109) are at a plurality of points in the connected position.

6. The drawer-type circuit interrupter as claimed in claim 5, wherein said second contact member (100, 108) includes a semi-circular arc shaped protrusion adapted to fit with a concave portion of the external line connect terminal (103, 107, 109) which it contacts.

* * * * *